US012078761B2

(12) United States Patent
Katoh et al.

(10) Patent No.: US 12,078,761 B2
(45) Date of Patent: Sep. 3, 2024

(54) SIGNAL DETECTION SYSTEM

(71) Applicant: FUJIFILM Corporation, Tokyo (JP)

(72) Inventors: Shunya Katoh, Kanagawa (JP); Naoyuki Morooka, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 932 days.

(21) Appl. No.: 17/105,632

(22) Filed: Nov. 27, 2020

(65) Prior Publication Data

US 2021/0103041 A1 Apr. 8, 2021

Related U.S. Application Data

(63) Continuation of application No. PCT/JP2019/021545, filed on May 30, 2019.

(30) Foreign Application Priority Data

May 30, 2018 (JP) ................................. 2018-103383

(51) Int. Cl.
G01S 7/499 (2006.01)
G01S 17/08 (2006.01)
(Continued)

(52) U.S. Cl.
CPC ............. G01S 7/499 (2013.01); G01S 17/08 (2013.01); G01S 17/58 (2013.01); G02B 5/126 (2013.01); G02B 5/26 (2013.01); G02B 5/3016 (2013.01)

(58) Field of Classification Search
None
See application file for complete search history.

(56) References Cited

U.S. PATENT DOCUMENTS 4,788,441 A * 11/1988 Laskowski ........... G01C 15/002
250/559.07
5,703,718 A * 12/1997 Ohtomo ................. G02B 27/28
250/225

(Continued)

FOREIGN PATENT DOCUMENTS

JP S6425784 2/1989
JP H09304772 11/1997

(Continued)

OTHER PUBLICATIONS

Office Action of Japan Counterpart Application, with English translation thereof, issued on Dec. 7, 2021, pp. 1-8.

(Continued)

Primary Examiner — Eric L Bolda
(74) Attorney, Agent, or Firm — JCIPRNET

(57) ABSTRACT

An object of the present invention is to provide a signal detection system capable of removing noise caused by scattered light or the like and capable of detecting an accurate signal. The problems can be solved by providing a signal detection system including an emitting unit that emits polarized light as measurement light, a retroreflection member that retroreflects the measurement light, and a detecting unit that detects the retroreflected measurement light, in which in the retroreflection member, a reflectance of first polarized light is higher than a reflectance of second polarized light which is polarized light having a property opposite to that of the first polarized light, and at least one of a first condition in which in the measurement light emitted from the emitting unit, an intensity of the first polarized light is higher than an intensity of the second polarized light, or a second condition in which in the detecting unit, a detection sensitivity of the first polarized light is higher than a detection sensitivity of the second polarized light is satisfied.

11 Claims, 2 Drawing Sheets

(51) Int. Cl.
*G01S 17/58* (2006.01)
*G02B 5/126* (2006.01)
*G02B 5/26* (2006.01)
*G02B 5/30* (2006.01)

(56) References Cited

U.S. PATENT DOCUMENTS

| | | | |
|---|---|---|---|
| 5,828,057 A * | 10/1998 | Hertzman | G01S 17/04 250/225 |
| 10,598,588 B2 | 3/2020 | Majima et al. | |
| 2008/0074642 A1* | 3/2008 | Hoersch | G01D 5/30 356/28 |
| 2011/0292636 A1* | 12/2011 | Fukai | F21S 41/24 362/19 |
| 2020/0142117 A1* | 5/2020 | Yanai | G01J 5/0025 |

FOREIGN PATENT DOCUMENTS

| | | |
|---|---|---|
| JP | 2000230805 | 8/2000 |
| JP | 2001165658 | 6/2001 |
| JP | 2003232613 | 8/2003 |
| JP | 2007141117 | 6/2007 |
| JP | 2008077451 | 4/2008 |
| JP | 2010219826 | 9/2010 |
| JP | 2014169965 | 9/2014 |
| JP | 2014211404 | 11/2014 |
| JP | 2017053739 | 3/2017 |
| JP | 2017146289 | 8/2017 |
| JP | 2017207717 | 11/2017 |
| WO | 2018235674 | 12/2018 |

OTHER PUBLICATIONS

"International Search Report (Form PCT/ISA/210) of PCT/JP2019/021545," mailed on Jul. 16, 2019, with English translation thereof, pp. 1-5.
"Written Opinion of the International Searching Authority (Form PCT/ISA/237) of PCT/JP2019/021545," mailed on Jul. 16, 2019, with English translation thereof, pp. 1-11.
"Office Action of Japan Counterpart Application" with English translation thereof, issued on Jun. 14, 2022, p. 1-p. 8.
"Notice of Reasons for Refusal of Japan Counterpart Application", issued on Dec. 6, 2022, with English translation thereof, p. 1-p. 8.

* cited by examiner

SIGNAL DETECTION SYSTEM

CROSS-REFERENCE TO RELATED APPLICATIONS

This application is a Continuation of PCT International Application No. PCT/JP2019/021545 filed on May 30, 2019, which claims priority under 35 U.S.C. § 119(a) to Japanese Patent Application No. 2018-103383 filed on May 30, 2018. The above application is hereby expressly incorporated by reference, in its entirety, into the present application.

BACKGROUND OF THE INVENTION

1. Field of the Invention

The present invention relates to a signal detection system used for motion capture and the like.

2. Description of the Related Art

A signal detection system such as a motion capture system and a ranging system (depth sensor) is used for motion analysis or the like in movies and sports.

As shown in JP2014-211404A and JP2017-053739A, in these systems, as an example, a reflector called a marker is attached to an object to be tested, a subject is irradiated with measurement light that is emitted from a light source, and then the subject is captured by a camera. Since the measurement light emitted to the subject is reflected on the marker, movements of the marker are measured following the principle of triangulation based on image information captured by the camera, and three-dimensional data is generated. Thereby, a movement of the subject and a distance to the subject are measured.

In such a signal detection system, a system using near infrared (NIR) light as the measurement light is widely used since near infrared light is invisible and can be detected by a charge-coupled device (CCD) camera or the like.

In addition, as the marker, a reflection member on which light is retroreflected is widely used.

SUMMARY OF THE INVENTION

In such a signal detection system, various kinds of light are captured by the camera as noise, which contributes to signal detection accuracy (measurement accuracy).

For example, in a case where the signal detection system is used outdoors, near infrared light included in sunlight is scattered at a place other than the marker, and the scattered near infrared light is measured by the camera, resulting in an increase in noise. Furthermore, in a case where there is a metal surface, a light-reflecting smooth surface, or the like near the subject, measurement light specularly reflected on these surfaces may be measured by the camera and may act as noise.

An object of the present invention is to solve the above described problems of the related art, and is to provide a signal detection system used for motion capture, a ranging system, and the like, in which noise which is caused from scattered light that is scattered from sunlight or measurement light that is specularly reflected can be removed, and an accurate signal can be detected.

The present invention solves the problems by the following configurations.

[1] A signal detection system comprising: an emitting unit that emits polarized light as measurement light; a retroreflection member on which the measurement light emitted from the emitting unit is retroreflected; and a detecting unit that measures the measurement light reflected on the retroreflection member, in which in the retroreflection member, a reflectance of first polarized light is higher than a reflectance of second polarized light which is polarized light having a property opposite to that of the first polarized light, and at least one of a first condition in which in the measurement light emitted from the emitting unit, an intensity of the first polarized light is higher than an intensity of the second polarized light, or a second condition in which in the detecting unit, a detection sensitivity of the first polarized light is higher than a detection sensitivity of the second polarized light is satisfied.

[2] The signal detection system according to [1], in which the first condition and the second condition are satisfied.

[3] The signal detection system according to [1] or [2], in which the first polarized light is circularly polarized light, and the second polarized light is circularly polarized light having a turning direction opposite to a turning direction of the first polarized light.

[4] The signal detection system according to any one of [1] to [3], in which light emitted from the emitting unit includes light having a wavelength of 700 to 2000 nm.

[5] The signal detection system according to any one of [1] to [4], in which the retroreflection member includes a reflector in which a cholesteric liquid crystalline phase is immobilized.

[6] The signal detection system according to any one of [1] to [5], in which the retroreflection member includes a spherical reflector.

[7] The signal detection system according to any one of [1] to [6], in which a plurality of the retroreflection members are disposed to be spaced apart from one another.

[8] The signal detection system according to any one of [1] to [7], in which the emitting unit includes a light source and a polarization filter.

[9] The signal detection system according to [8], in which the polarization filter is a reflective polarization filter.

[10] The signal detection system according to [9], in which the reflective polarization filter is a reflective circular polarization filter including a reflective layer in which a cholesteric liquid crystalline phase is immobilized.

[11] The signal detection system according to any one of [1] to [10], in which the detecting unit includes a detector and a polarization filter.

According to the present invention, in a signal detection system used for motion capture, a ranging system, and the like, noise which is caused from scattered light that is scattered from sunlight or measurement light that is specularly reflected from other than a marker can be removed, and an accurate signal can be detected.

DESCRIPTION OF THE PREFERRED EMBODIMENTS

Hereinafter, a signal detection system according to an embodiment of the present invention will be described in detail with reference to the suitable embodiments shown in the accompanying drawings.

In the specification, the numerical range represented by "to" means a range including the numerical values before and after "to" as the lower limit value and the upper limit value.

In the present specification, "(meth)acrylate" is used in the sense of "either one of or both of acrylate and methacrylate".

In the present specification, the retroreflection (recursive reflection) means reflection in which incident light is reflected in an incident direction.

In the present specification, a center wavelength of selective reflection (center wavelength of a selective reflection band) refers to a half value transmittance: an average value of two wavelengths showing T½ (%) represented by the following Expression, where Tmin (%) is a minimum value of a transmittance of a target object (member).

Expression for half value transmittance: $T\frac{1}{2}=100-(100-Tmin)/2$

Figure 1:
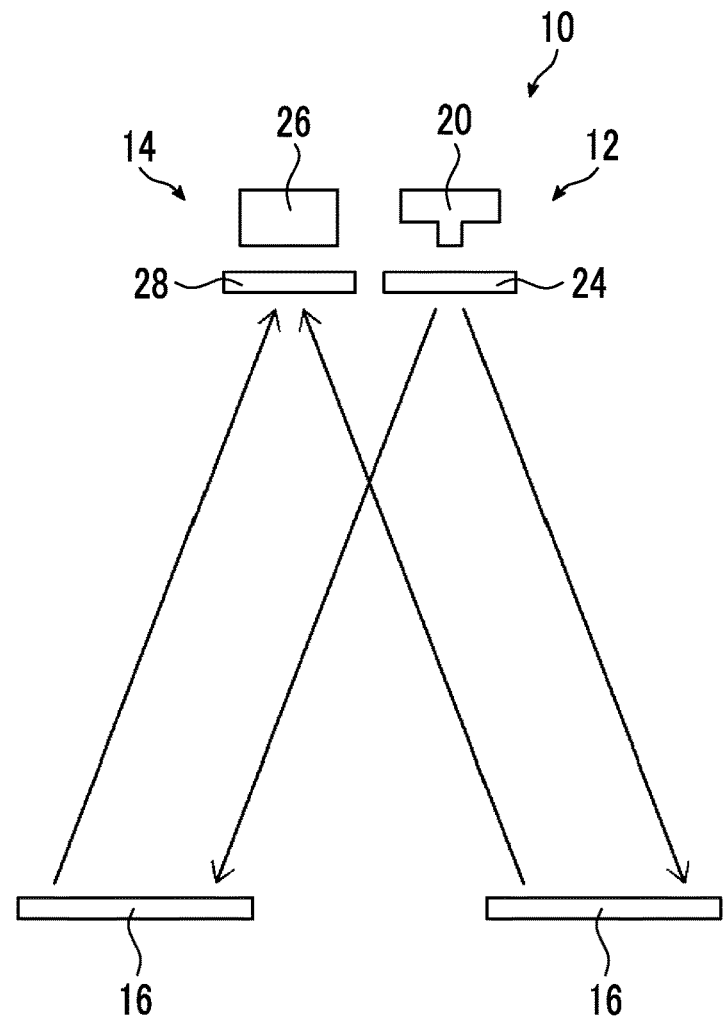
FIG. 1 is a diagram conceptually showing an example of a signal detection system of the present invention.

An example of a signal detection system of the present invention is conceptually shown in FIG. 1.

A signal detection system 10 shown in FIG. 1 includes an emitting unit 12, a detecting unit 14, and a marker 16.

In the signal detection system 10 of the illustrated example, the marker 16 is a retroreflection member of the present invention. The signal detection system 10 shown in FIG. 1 includes two markers 16 that are spaced apart from each other, but in the present invention, one marker 16 may be included, or three or more markers 16 may be included to be spaced apart from one another. The marker 16 may be attached only to a moving subject. Alternatively, the marker 16 may be attached only to a subject that does not move. Alternatively, the marker 16 may be attached to both the moving subject and the subject that does not move.

The signal detection system 10 according to the embodiment of the present invention is used, for example, in motion capture, a ranging system, and the like for measuring a movement of a subject, a distance to the subject, and the like.

In the signal detection system 10 according to the embodiment of the present invention, the marker 16 is attached to the subject (measurement target) by a known method such as a method using an adhesive or the like. Thereafter, the subject is irradiated with measurement light from the emitting unit 12, and an image is captured by the detecting unit 14. Furthermore, three-dimensional data is generated using the principle of triangulation from the captured image, that is, a result of measuring the measurement light that is retroreflected on the marker 16 attached to the subject. In the signal detection system 10 according to the embodiment of the present invention, as an example, the marker 16, that is, a movement of the subject, a distance to the subject, and the like are measured from the three-dimensional data generated as described above.

In the signal detection system 10, the measurement light is emitted from the emitting unit 12, and includes a light source 20 and a circular polarization filter 24 provided as a preferable aspect.

The light source 20 is a light source of the measurement light, and is not limited as long as the light source can emit light having a wavelength corresponding to the measurement light. Examples of the light source 20 include light emitting diodes (LEDs), laser diodes (LDs), a halogen lamp, a tungsten lamp, a xenon lamp, a metal halide lamp, a mercury lamp, and the like. Among these, LEDs and LDs are suitably exemplified.

The wavelength of the light emitted by the light source 20 is not limited. However, in the present invention, the measurement light preferably includes light in a wavelength range of 700 to 2000 nm. That is, the measurement light in the signal detection system 10 according to the embodiment of the present invention is preferably near infrared light. Thereby, the signal detection system 10 can perform measurement using invisible light. By using near infrared light as the measurement light, the marker 16 can be transparent and inconspicuous in a case where a spherical reflector in which a cholesteric liquid crystalline phase is immobilized is used for the marker 16 described later.

Therefore, as the light source 20, a light source having a center wavelength in the wavelength range of 700 to 2000 nm is suitably used. The center wavelength of the light source 20 is, for example, a peak wavelength of emitted light intensity.

A width of the wavelength range of the light emitted from the light source 20 is not limited. Therefore, the width of the wavelength range of the light emitted from the light source 20 may be set appropriately. The width of the wavelength range of the light emitted from the light source 20 may be determined by, for example, a half-width.

The circular polarization filter 24 is a known circular polarization filter that transmits one of right circularly polarized light or left circularly polarized light and that blocks the other.

In the signal detection system 10 of the illustrated example, as an example, the right circularly polarized light is referred to as first polarized light in the present invention, and the left circularly polarized light is referred to as second polarized light in the present invention. In the signal detection system according to the embodiment of the present invention, in a case where the circularly polarized light is used as the measurement light, the first polarized light may be the left circularly polarized light and the second circularly polarized light may be the right circularly polarized light, in contrast to the above description.

In the present invention, the second polarized light is polarized light having a property opposite to that of the first polarized light. The polarized light having a property opposite to that of certain polarized light is, specifically, polarized light positioned on the back side of the Poincare sphere with respect to certain polarized light. In other words, the relationship between the first polarized light and the second polarized light corresponds to a relationship between a first point on the Poincare sphere in a certain polarization state and a second point on the Poincare sphere in a certain polarization state, the second point being positioned at a position facing the first point so that the center of the Poincare sphere is interposed therebetween. That is, the polarized light having a property opposite to that of certain polarized light means the right circularly polarized light and the left circularly polarized light in the case of circularly polarized light. In addition, in the case of linearly polarized light, the polarized light having a property opposite to that of certain polarized light means linearly polarized light in two orthogonal polarization states, and examples thereof include vertically linearly polarized light and horizontally linearly polarized light, 45° linearly polarized light and −45° linearly polarized light, and the like.

In the signal detection system 10, the circularly polarized light is used as the measurement light, but the present invention is not limited thereto. That is, in the present invention, as the measurement light, the linearly polarized light may be used, or elliptically polarized light may be used.

However, the circularly polarized light is suitably used as the measurement light in that noise described later can efficiently and suitably be removed and that alignment during a system installation is simple.

As described above, in the signal detection system 10 of the illustrated example, as an example, the right circularly polarized light is referred to as first polarized light, and the left circularly polarized light is referred to as second polarized light. Therefore, in the emitting unit 12, the circular polarization filter 24 is a circular polarization filter that transmits the right circularly polarized light and blocks the left circularly polarized light.

In the signal detection system 10 of the illustrated example, the emitting unit 12 is provided with the circular polarization filter 24 to block the left circularly polarized light by the circular polarization filter 24 from the light emitted from the light source 20. Thereby, the emitting unit 12 of the signal detection system 10 makes an intensity (light amount) of the right circularly polarized light that is the first polarized light higher than an intensity of the left circularly polarized light that is the second polarized light, in the emitted measurement light. That is, the signal detection system 10 satisfies a first condition in the present invention, in which the intensity of the first polarized light is higher than the intensity of the second polarized light, in the measurement light emitted from the emitting unit 12.

The circular polarization filter 24 is not limited and various known filters can be used.

As an example, depending on the light source 20, a circular polarization filter in which a polarizer (linear polarizer), a λ/4 plate (λ/4 retardation plate), and a cholesteric liquid crystal layer are appropriately selected and combined is exemplified. The cholesteric liquid crystal layer is a layer formed by immobilizing a cholesteric liquid crystalline phase. The cholesteric liquid crystalline phase will be described in detail later.

For example, in a case where the light source 20 is a light source that emits a non-polarized light, such as LEDs, a circular polarization filter 24 in which a linear polarizer and a λ/4 plate are combined is exemplified. On the other hand, in a case where the light source 20 is a light source such as LDs that emits linearly polarized light, a λ/4 plate is exemplified as a circular polarization filter 24. As the circular polarization filter, a circular polarization filter 24 having a cholesteric liquid crystal layer that reflects the left circularly polarized light (or the right circularly polarized light) in a specific wavelength range and that transmits the other light can also be suitably used.

(Linear Polarizer)

As the linear polarizers, linear polarizers including linear polarizers having a function of converting the non-polarized light into the linearly polarized light may be used. Among these, the linear polarizers preferably have a function of converting the non-polarized light in an infrared wavelength range into the linearly polarized light.

The linear polarizers include reflective linear polarizers and absorptive linear polarizers.

Examples of the reflective linear polarizers include (i) linearly polarized light reflecting plate having a multilayer structure, (ii) a polarizer in which thin films having different birefringent properties are laminated, (iii) a wire grid polarizer, (iv) a polarization prism, (V) an anisotropic scattering polarizer, and the like.

An example of (i) the linearly polarized light reflecting plate having a multilayer structure includes linearly polarized light reflecting plate formed by laminating a plurality of dielectric thin films having different refractive indices. In order to form a wavelength selective reflection film, alternate lamination of a dielectric thin film of a high refractive index and a dielectric thin film of a low refractive index in plural layers is preferable. The layer is not limited to use two kinds, and two or more kinds of layers may be used.

The number of layers to be laminated is preferably 2 to 20, more preferably 2 to 12, even more preferably 4 to 10, and particularly preferably 6 to 8. In a case where the lamination number is greater than 20, the production efficiency may be lowered due to multilayer deposition.

A lamination order of dielectric thin films is not particularly limited, and can be appropriately selected in accordance with the purpose. For example, in a case where an adjacent film has a high refractive index, a film having a lower refractive index than the adjacent film is laminated first. In an opposite manner, in a case where an adjacent layer has a low refractive index, a film having a higher refractive index than the adjacent film is laminated first. A boundary line whether the refractive index is high or low is 1.8. Whether a refractive index is high or low is not an absolute matter, but even among materials of high refractive indices, materials having a relatively large refractive index and a relatively small may exist, and the materials having a relatively large refractive index and a relatively small may be used alternately.

Examples of the material of a dielectric thin film having a high refractive index include $Sb_2O_3$, $Sb_2S_3$, $Bi_2O_3$, $CeO_2$, $CeF_3$, $HfO_2$, $La_2O_3$, $Nd_2O_3$, $Pr_6O_{11}$, $Sc_2O_3$, $SiO$, $Ta_2O_5$, $TiO_2$, $TlCl$, $Y_2O_3$, $ZnSe$, $ZnS$, $ZrO_2$, and the like. Among these, $Bi_2O_3$, $CeO_2$, $CeF_3$, $HfO_2$, $SiO$, $Ta_2O_5$, $TiO_2$, $Y_2O_3$, $ZnSe$, $ZnS$, $ZrO_2$, and the like are preferably exemplified, and $SiO$, $Ta_2O_5$, $TiO_2$, $Y_2O_3$, $ZnSe$, $ZnS$, $ZrO_2$, and the like are particularly preferably exemplified.

Examples of the material of a dielectric thin film having a low refractive index include $Al_2O_3$, $BiF_3$, $CaF_2$, $LaF_3$, $PbCl_2$, $PbF_2$, $LiF$, $MgF_2$, $MgO$, $NdF_3$, $SiO_2$, $Si_2O_3$, $NaF$, $ThO_2$, $ThF_4$, and the like. Among these, $Al_2O_3$, $BiF_3$, $CaF_2$, $MgF_2$, $MgO$, $SiO_2$, $Si_2O_3$, and the like are preferably exemplified, and $Al_2O_3$, $CaF_2$, $MgF_2$, $MgO$, $SiO_2$, $Si_2O_3$, and the like are particularly preferably exemplified.

In the material of a dielectric thin film, an atomic ratio is also not particularly limited, and can be appropriately selected in accordance with the purpose. The atomic ratio can be adjusted by changing the concentration of atmospheric gas during deposition.

A method of forming a dielectric thin film is not particularly limited, and can be appropriately selected in accordance with the purpose. Examples of the method of forming a dielectric thin film include vacuum evaporation methods such as an ion plating method and an ion beam method, physical vapor deposition (PVD) methods such as sputtering, chemical vapor deposition (CVD) methods, and the like. Among these, the vacuum evaporation method and the sputtering method are preferably exemplified, and the sputtering method is particularly preferably exemplified.

As the sputtering method, a direct current (DC) sputtering method with a high deposition rate is preferable. In the DC sputtering method, a material of high conductivity is preferably used.

In addition, as a method of performing multilayer deposition by the sputtering method, there are, for example, (1) a one chamber method that performs deposition alternately or in order from a plurality of targets in one chamber, and (2) a multi chamber method that performs deposition continuously in a plurality of chambers. Among these, from the viewpoint of productivity and prevention of material contamination, the multi chamber method is particularly preferable.

The thickness of the dielectric thin film is not limited, but in an optical wavelength order, a thickness of $\lambda/16$ to $\lambda$ is preferable, $\lambda/8$ to $3\lambda/4$ is more preferable, and $\lambda/6$ to $3\lambda/8$ is even more preferable.

A part of light propagating in an evaporated dielectric layer is reflected for each dielectric thin film, which is multiple reflection. These reflected rays of light interfere with one another, and only light having a wavelength determined by the product of the thickness of the dielectric thin film and the refractive index of the film for the light is transmitted selectively. In addition, a central transmission wavelength of the evaporated dielectric layer has an angle dependency relative to incident light, and the transmission wavelength can be changed by changing incident light.

(ii) As a polarizer in which thin films having different birefringent properties are laminated, polarizers described in JP1997-506837A (JP-H09-506837A) or the like can be used.

Specifically, in a case of performing processing under conditions selected in order to obtain the relationship of refractive indices, a polarizer can be formed by widely using various materials. Generally, one of first materials is required to have a refractive index different from a second material in a selected direction. The difference in refractive indices can be achieved by various methods including stretching during film formation or after film formation, extrusion molding, and coating. Furthermore, two materials preferably have similar rheologic properties (for example, melt viscosity) so that the two materials can be coextruded.

As a polarizer obtained by laminating thin films having different birefringent properties, a commercially available product can be used. Examples of the commercially available product include a trade name DBEF manufactured by 3M Company.

(iii) The wire grid polarizer is a polarizer that allows one component of polarized light to be transmitted and the other component to be reflected, by birefringence of thin metal wires.

The wire grid polarizer is a polarizer obtained by arranging metal wires periodically, and is mainly used as a polarizer in a terahertz wave band. In order for a wire grid to function as a polarizer, an interval between wires is necessarily smaller than the wavelength of incident electromagnetic wave sufficiently.

In the wire grid polarizer, metal wires are arranged at regular intervals. A polarized light component in a polarized light direction that is parallel to a longitudinal direction of the metal wire is reflected on the wire grid polarizer, and a polarized light component in a perpendicular polarized light direction passes through the wire grid polarizer.

As the wire grid polarizer, a commercially available product can be used. Examples of the commercially available product of the wire grid polarizer include a wire grid polarization filter 50×50, NT46-636 manufactured by Edmund Optics Inc., and the like.

Examples of absorptive linear polarizers include (i) a polarizer having shape anisotropic metal nano-particles arranged and fixed therein, (ii) a polarizer having a dichroic dye arranged and fixed therein, and the like.

(i) The polarizer having shape anisotropic metal nano-particles arranged and fixed therein is a polarizer in which silver halide particles or silver particles, which has a high aspect ratio, are aligned and fixed. This polarizer is an absorptive linear polarizer which absorbs light having an electric field oscillation plane in an arrangement direction of particles, and transmits light in a direction perpendicular to the arrangement direction of particles. As polarizers belonging thereto, polarizers disclosed in JP1984-083951A (JP-S59-083951A), JP1990-248341A (JP-H02-248341A), and JP2003-139951A can be used.

Examples of (ii) the polarizer having a dichroic dye arranged and fixed therein include a polarization film obtained by adsorbing iodine to polyvinyl alcohol (PVA) or doping polyvinyl alcohol (PVA) with a dichroic colorant, and by stretching the PVA, and the like. In order to obtain a polarizer in an infrared region, the polyvinyl alcohol is partially dehydrated and can be used as polyvinylene. This polarizer absorbs light having an electric field oscillation plane by the stretching method, and transmits light in a direction perpendicular to the arrangement direction of particles.

A PVA film passes through a vessel containing a dyeable composition such as iodine or an iodide to dye the PVA layer, and the layer is stretched by a factor of 4 to 6 times, thereby alignment of the dichroic dye capable of being obtained. The conversion of PVA into polyvinylene can be performed by a hydrochloric acid vapor method disclosed in U.S. Pat. No. 2,445,555A. In addition, in order to improve stability of the materials for polarization, boration of the material into is also performed by using an aqueous borate bath containing boric acid and borax. A commercially available film for near infrared linear polarized light manufactured by Edmund Optics Japan Co., Ltd. can be used as a product corresponding thereto.

The thickness of the linear polarizer is not limited, but is preferably 0.05 to 300 μm, more preferably 0.2 to 150 μm, and even more preferably 0.5 to 100 μm.

(λ/4 Plate)

Front retardation of a λ/4 plate may have a length of ¼ of the infrared wavelength range or "a center wavelength*n±¼ of a center wavelength (n is an integer)". In particular, the length may be a length of ¼ of a reflection wavelength of a reflection film or a length of ¼ a center wavelength of an emission wavelength of a light source. For example, in a case where the emission center wavelength of the light source is 1000 nm, it is preferable that the retardation is 250 nm, 750 nm, 1250 nm, 1750 nm, or the like. In addition, the smaller the dependence of the retardation on a light incidence angle, the better, and in view of this, a retardation plate having retardation having a length of ¼ of the center wavelength is most preferable.

The front retardation can be measured by allowing light having a wavelength in the infrared wavelength range to be incident in a normal direction of the film in a KOBRA 21ADH or WR (manufactured by Oji Scientific Instruments). In a case of selecting a measurement wavelength, a wavelength-selective filter is manually exchanged, or a measurement value is converted using a program, or the like to perform the measurement.

The λ/4 plate is not limited, and can be appropriately selected according to the purpose. Examples of the λ/4 plate include a stretched polycarbonate film, a stretched norbornene-based polymer film, transparent films containing aligned inorganic particles having birefringence such as strontium carbonate, and a thin film in which an inorganic dielectric material is obliquely vapor-deposited on a support.

Examples of the λ/4 plate include (1) a retardation plate described in JP1993-027118A (JP-H05-027118A) and JP1993-027119A (JP-H05-027119A) in which a birefringent film having large retardation and a birefringent film having small retardation are laminated such that optical axes thereof are perpendicular to each other, (2) a retardation plate described in JP1998-068816A (JP-H10-068816A) in which a polymer film having a λ/4 wavelength at a specific wavelength and a polymer film made of the same material as the former polymer film and having a λ/2 wavelength at the same wavelength are laminated to obtain a λ/4 wavelength in a wide wavelength range, (3) a retardation plate described in JP1998-090521A (JP-H10-090521A), capable of achieving a λ/4 wavelength in a wide wavelength range by laminating two polymer films, (4) a retardation plate capable of achieving a λ/4 wavelength in a wide wavelength range by using a modified polycarbonate film described in WO00/026705A, and (5) a retardation plate capable of achieving a λ/4 wavelength in a wide wavelength range by using a cellulose acetate film described in WO00/065384A.

A commercially available product may also be used as the λ/4 plate. Examples of the commercially available product of the λ/4 plate include PURE-ACE WR (trade name) (manufactured by TEIJIN LIMITED).

The thickness of the λ/4 layer is not limited, but is preferably 0.2 to 300 μm, more preferably 0.5 μm to 150 μm, and even more preferably 1 to 80 μm.

The λ/4 plate may be used and arranged so that the optical axis of the λ/4 plate is 45° with respect to a transmission axis of the linear polarizer.

In a case where the circular polarization filter 24 includes a polarizer and a λ/4 plate, the polarizer and the λ/4 plate are arranged so as to dispose the polarizer on the light source side.

In a case where the circular polarization filter 24 is used for the emitting unit 12, as the circular polarization filter 24, a reflective circular polarization filter that transmits the right circularly polarized light (first polarized light) and that reflects the left circularly polarized light (second polarized light) is preferably exemplified. Out of these, the reflective circular polarization filter 24 in which a cholesteric liquid crystal layer is used is particularly suitably exemplified. That is, in the illustrated example, the reflective circular polarization filter 24 in which a cholesteric liquid crystal layer that transmits the right circularly polarized light and that reflects the left circularly polarized light is used is particularly suitably exemplified.

In a case of using the reflective circular polarization filter 24, for example, a reflecting plate is disposed together with the circular polarization filter 24 so that the light source 20 is interposed therebetween, and the left circularly polarized light reflected on the circular polarization filter 24 is reflected on the reflecting plate. Thereby, the left circularly polarized light is converted into the right circularly polarized light having a turning direction opposite to a turning direction of the left circularly polarized light to pass through the circular polarization filter 24. That is, by using the circular polarization filter 24 in the emitting unit 12, the light emitted from the light source 20 can be efficiently used without any loss, and an amount of the measurement light emitted from the emitting unit 12 can be increased.

In the present invention, a difference between an intensity of the right circularly polarized light (first polarized light) and an intensity of the left circularly polarized light (second polarized light), in the measurement light emitted from the emitting unit 12, is not limited, and the intensity of the right circularly polarized light may be higher than the intensity of the left circularly polarized light.

From the viewpoint that the noise removal effect described later increases, the larger the difference between the intensities of the right circularly polarized light and the left circularly polarized light in the measurement light emitted from the emitting unit 12, the better.

That is, in the signal detection system 10 according to the embodiment of the present invention, as an example, a polarized light intensity ratio of the measurement light emitted from the emitting unit 12, as an example, a polarized light intensity ratio may be greater than "0", the polarized light intensity ratio being represented by "(intensity of right circularly polarized light−intensity of left circularly polarized light)/(intensity of right circularly polarized light+intensity of left circularly polarized light). However, the greater the polarized light intensity ratio, the better, and it is most preferable that the polarized light intensity ratio is "1".

The detecting unit 14 receives the measurement light that is emitted from the emitting unit 12 and that is retroreflected on the marker 16, and measures the light amount.

The detecting unit 14 includes a detector 26 and a circular polarization filter 28 provided as a preferable aspect.

A known two-dimensional photodetector (camera) can be used as the detector 26 as long as the two-dimensional photodetector can measure the measurement light emitted from the emitting unit 12, that is, the two-dimensional photodetector has a sensitivity in a wavelength range of the measurement light emitted from the emitting unit 12.

As described above, in the signal detection system 10 according to the embodiment of the present invention, the measurement light including the wavelength range (near infrared light) of 700 to 2000 nm is preferably emitted from the emitting unit 12. Therefore, the detector 26 having the sensitivity to light in the wavelength range of 700 to 2000 nm is suitably used.

As the detector 26, for example, a CCD camera (CCD sensor), a CMOS (complementary metal-oxide-semiconductor) camera (CMOS sensor), and the like are exemplified.

The circular polarization filter 28, similar to the above described the circular polarization filter, is a known circular polarization filter that transmits one of right circularly polarized light or left circularly polarized light and that blocks the other.

As described above, in the signal detection system 10 of an illustrated example, as an example, the right circularly polarized light is referred to as first polarized light in the present invention, and the left circularly polarized light is referred to as second polarized light in the present invention. Therefore, the circular polarization filter 28 of the detecting unit 14 is also a circular polarization filter that transmits the right circularly polarized light and that blocks the left circularly polarized light, as an example.

In the signal detection system 10 of the illustrated example, the detecting unit 14 is provided with the circular polarization filter 28, and the left circularly polarized light to be incident on the detector 26 is blocked by the circular polarization filter 28. Thereby, a detection sensitivity of the right circularly polarized light is set higher than a detection sensitivity of the left circularly polarized light. That is, the signal detection system 10 satisfies a second condition in the present invention, in which the detection sensitivity of the first polarized light is higher than the detection sensitivity of the second polarized light, in the detecting unit 14.

That is, the signal detection system 10 of the illustrated example satisfies both the first condition and the second condition of the present invention as a preferable aspect.

In the detecting unit 14, the circular polarization filter 28 is not limited, and various known circular polarization filters including those exemplified as the circular polarization filter 24 described above can be used.

In the present invention, a difference between an intensity of the right circularly polarized light (first polarized light) and an intensity of the left circularly polarized light (second polarized light), in the detecting unit 14, is not limited, and a detection sensitivity of the right circularly polarized light may be higher than a detection sensitivity of the left circularly polarized light.

From the viewpoint that the noise removal effect described later increases, the larger the difference between the detection sensitivities of the right circularly polarized light and the left circularly polarized light in the detecting unit 14, the better.

That is, in the signal detection system 10 according to the embodiment of the present invention, as an example, a polarized light detection sensitivity ratio of the detection sensitivity in the detecting unit 14 may be greater than "0", the polarized light detection sensitivity ratio being represented by "(detection sensitivity of right circularly polarized light−detection sensitivity of left circularly polarized light)/(detection sensitivity of right circularly polarized light+detection sensitivity of left circularly polarized light". However, the greater the polarized light detection sensitivity ratio, the better, and it is most preferable that the polarized light detection sensitivity ratio is "1".

In the signal detection system 10 according to the embodiment of the present invention, a positional relationship between the emitting unit 12 and the detecting unit 14 is not limited, and the detecting unit 14 may be disposed at a position where the measurement light that is emitted from the emitting unit 12 and that is retroreflected on the marker 16 can be received depending on light reflection characteristics of the marker 16, the size of a light receiving section in the detecting unit 14, and an angle of view of the detecting unit, or the like.

The marker 16 is a retroreflection member in the signal detection system 10 according to the embodiment of the present invention, retroreflects the measurement light emitted from the emitting unit 12, and makes the retroreflected light to be incident on the detecting unit 14.

Here, in the present invention, the marker 16 has a reflectance of the right circularly polarized light (first polarized light) higher than the left circularly polarized light (second polarized light).

The signal detection system 10 according to the embodiment of the present invention uses the marker 16 (retroreflection member), and satisfies at least one of the first condition in which the intensity of the right circularly polarized light is higher than the intensity of the left circularly polarized light, in the measurement light emitted from the emitting unit 12, or the second condition in which the detection sensitivity of the right circularly polarized light is higher than the detection sensitivity of the left circularly polarized light, in the detecting unit 14. With the signal detection system 10 according to the embodiment of the present invention having this configuration, in the signal detection system used for motion capture, a ranging system, and the like, noise which is caused from scattered light that is scattered from sunlight, and the like or measurement light that is specularly reflected from other than the marker 16, and the like can be removed, and an accurate signal can be detected. This point will be described in detail later.

In the signal detection system 10 according to the embodiment of the present invention, the difference in reflectance by the marker 16 is not limited as long as the reflectance of the right circularly polarized light that is the first polarized light may be higher than the reflectance of the left circularly polarized light that is the second polarized light.

From the viewpoint that the noise removal effect described later increases, the larger the difference between the reflectance of the right circularly polarized light and the reflectance of the left circularly polarized light by the marker 16, the better.

That is, in the signal detection system 10 according to the embodiment of the present invention, as an example, a polarized light reflectance ratio of the reflectance by the marker may be greater than "0", the polarized light reflectance ratio being represented by "(reflectance of right circularly polarized light−reflectance of left circularly polarized light)/(reflectance of right circularly polarized light+reflectance of left circularly polarized light). However, the greater the polarized light reflectance ratio, the better, and it is most preferable that the polarized light reflectance ratio is "1".

In the signal detection system 10 according to the embodiment of the present invention, the marker 16 is not limited as long as the marker 16 can retroreflect incident light and has the higher reflectance of the right circularly polarized light than the reflectance of the left circularly polarized light, and various known retroreflection members such as a retroreflection member in which beads are used, and a prism-type retroreflection member can be used.

Figure 2:
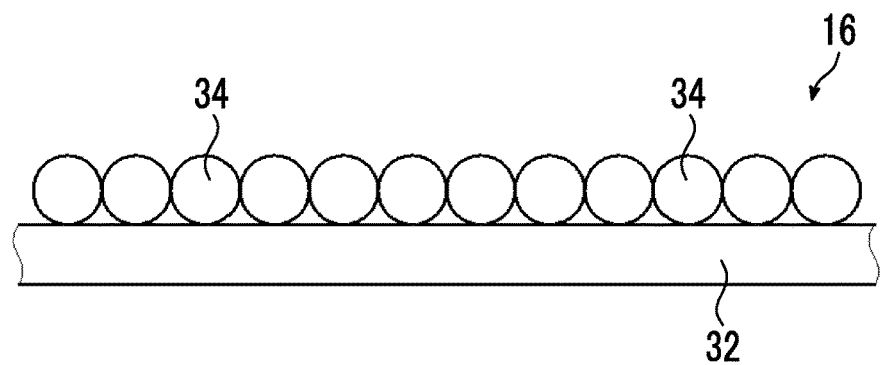
FIG. 2 is a diagram conceptually showing an example of a marker used in the signal detection system of the present invention.

As the marker 16, as shown conceptually in FIG. 2, a marker in which a spherical reflector 34 in which a cholesteric liquid crystalline phase is immobilized on a surface of a support 32, is two-dimensionally arranged regularly or irregularly on the surface of the support is exemplified as an example.

In the following description, the spherical reflector 34 in which a cholesteric liquid crystalline phase is immobilized, is also referred to as "cholesteric particles 34".

As the support 32, a known sheet-shaped material (film, or plate-shaped material) such as films of various resin materials such as polyethylene, polypropylene, polytetrafluoroethylene, polyethylene terephthalate, and polyethylene naphthalate, paper, and glass can be used. The support 32 is preferably transparent.

In addition, the cholesteric particles 34 may be fixed to the support 32 by a known method such as a method using an adhesive, a method using an adhesive material, or a method using an adhesive tape.

As described above, the cholesteric particles 34 is a reflector having a spherical structure, which is formed by immobilizing a cholesteric liquid crystalline phase.

As is well known, the cholesteric liquid crystalline phase has wavelength selective reflectivity that exhibits selective reflectivity at a specific wavelength. In addition, the cholesteric liquid crystalline phase reflects only the right circularly polarized light or the left circularly polarized light in a selective reflection wavelength range and transmits other light.

A center wavelength $\lambda$ of selective reflection of the cholesteric liquid crystalline phase (selective reflection center wavelength $\lambda$) depends on a pitch P (=helix period) of a helical structure in the cholesteric liquid crystalline phase, and is based on a relationship between an average refractive index n and $\lambda = n \times P$. Therefore, the selective reflection center wavelength can be adjusted by adjusting the pitch of this helical structure. The pitch of the cholesteric liquid crystalline phase depends on a kind of a chiral agent used together with the polymerizable liquid crystal compound or on an added concentration thereof, so that a desired pitch can be obtained by adjusting the kind or the concentration.

In addition, a half-width $\Delta\lambda$ (nm) of a selective reflection band (circularly polarized light reflection band) exhibiting selective reflection depends on a refractive index anisotropy $\Delta n$ of the cholesteric liquid crystalline phase and the helical pitch P, and is based on a relationship of $\Delta\lambda=\Delta n \times P$. Therefore, a width of the selective reflection band can be controlled by adjusting the refractive index anisotropy $\Delta n$ of the cholesteric liquid crystalline phase. The refractive index anisotropy $\Delta n$ can be adjusted according to kinds of liquid crystal compounds forming the cholesteric particles 34 and a mixing ratio thereof, and a temperature during immobilization of an alignment.

As a method of measuring helical sense or pitch, the methods described in "Introduction to Experimental Liquid Crystal Chemistry", edited by The Japanese Liquid Crystal Society, published in 2007 by Sigma Publishing Co., Ltd., p. 46, and "Liquid Crystal Handbook", the Editing Committee of Liquid Crystal Handbook, Maruzen Publishing Co., Ltd., p. 196 can be used.

Reflected light of the cholesteric liquid crystalline phase is circularly polarized light. Whether or not the reflected circularly polarized light is right circularly polarized light or left circularly polarized light is determined depending on a helical twisted direction of the cholesteric liquid crystalline phase. Regarding the selective reflection of the circularly polarized light by the cholesteric liquid crystalline phase, in a case where the helical twisted direction of the cholesteric liquid crystalline phase is right, the right circularly polarized light is reflected, and in a case where the helical twisted direction of the cholesteric liquid crystalline phase is left, the left circularly polarized light is reflected.

As described above, in the signal detection system 10 according to the embodiment of the present invention, the marker 16 has the lower reflectance of the right circularly polarized light that is the first polarized light than the reflectance of the left circularly polarized light that is the second circularly polarized light. Therefore, the cholesteric particles 34 are formed of a right-twisted cholesteric liquid crystalline phase. In a case where the first polarized light in the present invention is left circularly polarized light, the cholesteric particles 34 forming the marker 16 may be formed of a left-twisted cholesteric liquid crystalline phase.

A turning direction of the cholesteric liquid crystalline phase can be adjusted by kinds of liquid crystal compounds forming the cholesteric particles 34 and/or kinds of added chiral agents.

As described above, the cholesteric particles 34 forming the marker 16 is a reflector in which a cholesteric liquid crystalline phase is immobilized.

The structure in which a cholesteric liquid crystalline phase is immobilized may be a structure in which the alignment of the liquid crystal compound as a cholesteric liquid crystalline phase is immobilized. Typically, the structure may be a structure which is obtained by making a polymerizable liquid crystal compound to be in a state where a cholesteric liquid crystalline phase is aligned, polymerizing and curing the polymerizable liquid crystal compound with ultra violet (UV) irradiation, heating, or the like to form a reflector having no fluidity, and concurrently changing the state of the polymerizable liquid crystal compound into a state where the alignment state is not changed by an external field or an external force.

In the cholesteric particles 34 formed by immobilizing a cholesteric liquid crystalline phase, it is sufficient as long as the optical characteristics of the cholesteric liquid crystalline phase are maintained, and the liquid crystal compound also may not necessarily exhibit liquid crystallinity. For example, a molecular weight of the polymerizable liquid crystal compound may be increased by a curing reaction to lose the liquid crystallinity thereof.

Examples of a material used for forming the cholesteric particles 34 include a liquid crystal composition including a liquid crystal compound. The liquid crystal compound is preferably a polymerizable liquid crystal compound.

The liquid crystal composition including a liquid crystal compound used for forming the cholesteric particles further preferably includes a surfactant. In addition, the liquid crystal composition used for forming the cholesteric particles 34 may further include a chiral agent, a polymerization initiator, an aligning agent, or the like.

In particular, the liquid crystal composition for forming the cholesteric particles 34 that reflects the right circularly polarized light is preferably a polymerizable cholesteric liquid crystal composition including a polymerizable liquid crystal compound, a chiral agent that induces right twist, and a polymerization initiator. In addition, in a case of forming the cholesteric particles 34 that reflects the left circularly polarized light, the liquid crystal composition is preferably a polymerizable cholesteric liquid crystal composition including a polymerizable liquid crystal compound, a chiral agent that induces left twist, and a polymerization initiator.

—Polymerizable Liquid Crystal Compound—

The polymerizable liquid crystal compound may be a rod-shaped liquid crystal compound or a disk-shaped liquid crystal compound, and is preferably a rod-shaped liquid crystal compound.

Examples of the rod-shaped polymerizable liquid crystal compound for forming the cholesteric liquid crystalline phase include a rod-shaped nematic liquid crystal compound. As the rod-shaped nematic liquid crystal compound, an azomethine compound, an azoxy compound, a cyanobiphenyl compound, a cyanophenyl ester compound, a benzoate compound, a phenyl cyclohexanecarboxylate compound, a cyanophenylcyclohexane compound, a cyano-substituted phenylpyrimidine compound, an alkoxy-substituted phenylpyrimidine compound, a phenyldioxane compound, a tolan compound, or an alkenylcyclohexylbenzonitrile compound is preferably used. Not only a low-molecular-weight liquid crystal compound but also a high-molecular-weight liquid crystal compound can also be used as the polymerizable liquid crystal compound.

The polymerizable liquid crystal compound can be obtained by introducing a polymerizable group into the liquid crystal compound. Examples of the polymerizable group include an unsaturated polymerizable group, an epoxy group, and an aziridinyl group. Among these, an unsaturated polymerizable group is preferable, and an ethylenically unsaturated polymerizable group is more preferable. The polymerizable group can be introduced into the molecules of the liquid crystal compound using various methods. The number of polymerizable groups in the polymerizable liquid crystal compound is preferably 1 to 6, and more preferably 1 to 3. Examples of the polymerizable liquid crystal compound include compounds described in Makromol. Chem. (1989), Vol. 190, p. 2255, Advanced Materials (1993), Vol. 5, p. 107, U.S. Pat. Nos. 4,683,327A, 5,622,648A, 5,770, 107A, WO95/022586A, WO95/024455A, WO97/000600A, WO98/023580A, WO98/052905A, JP1989-272551A (JP-H01-272551A), JP1994-016616A (JP-H06-016616A), JP1995-110469A (JP-H07-110469A), JP 1999-080081A (JP-H11-080081A), JP2001-328973A, JP2011-207941A, JP2012-006997A, JP2008-019240A, JP2013-166879A, JP2014-198814A, JP2014-198815A, and the like. Two or more kinds of the polymerizable liquid crystal compounds may be used in combination. In a case where two or more kinds of the polymerizable liquid crystal compounds are used in combination, the alignment temperature can be decreased.

The addition amount of the polymerizable liquid crystal compound in the liquid crystal composition is preferably 75% to 99.9% by mass, more preferably 80% to 99% by mass, and even more preferably 85% to 90% by mass, with respect to a solid content mass (mass excluding a solvent) of the liquid crystal composition.

—Chiral Agent (Optically Active Compound)—

The chiral agent has a function of causing a helical structure of a cholesteric liquid crystalline phase to be induced. The chiral agent may be selected depending on the purpose since a helical twisted direction or a helical pitch induced from the compound varies.

That is, in a case where the cholesteric particles 34 that reflects the right circularly polarized light is formed, a chiral agent that induces right twist may be used, and in a case where the cholesteric particles 34 that reflects the left circularly polarized light is formed, a chiral agent that induces left twist may be used.

The chiral agent is not limited, and a known compound (for example, Liquid Crystal Device Handbook (No. 142 Committee of Japan Society for the Promotion of Science, 1989), Chapter 3, Article 4-3, chiral agent for twisted nematic (TN) or super twisted nematic (STN), p. 199), isosorbide, or an isomannide derivative can be used.

The chiral agent generally includes asymmetric carbon atoms. However, an axially asymmetric compound or a planar asymmetric compound, which does not have asymmetric carbon atoms, can also be used as a chiral agent. Examples of the axially asymmetric compound or the planar asymmetric compound include binaphthyl, helicene, paracyclophane, and derivatives thereof. The chiral agent may include a polymerizable group. In a case where both the chiral agent and the liquid crystal compound have a polymerizable group, a polymer that includes a repeating unit derived from the polymerizable liquid crystal compound and a repeating unit derived from the chiral agent can be formed by a polymerization reaction of a polymerizable chiral agent and the polymerizable liquid crystal compound. In this aspect, the polymerizable group contained in the polymerizable chiral agent is preferably the same group as the polymerizable group contained in the polymerizable liquid crystal compound. Therefore, the polymerizable group of the chiral agent is preferably an unsaturated polymerizable group, an epoxy group, or an aziridinyl group, more preferably an unsaturated polymerizable group, and even more preferably an ethylenically unsaturated polymerizable group.

In addition, the chiral agent may be a liquid crystal compound.

In a case where the chiral agent includes a photoisomerization group, a pattern having a desired reflection wavelength corresponding to an emission wavelength can be formed by photomask exposure of an actinic ray or the like after coating and alignment, which is preferable. As the photoisomerization group, an isomerization portion of a photochromic compound, an azo group, an azoxy group, or a cinnamoyl group is preferable. As specific compounds, chiral agents described in JP2000-147236A, JP2002-080478A, JP2002-080851A, JP2002-179633A, JP2002-179668A, JP2002-179669A, JP2002-179670A, JP2002-179681A, JP2002-179682A, JP2002-302487A, JP2002-338575A, JP2002-338668A, JP2003-306490A, JP2003-306491A, JP2003-313187A, JP2003-313188A, JP2003-313189A, JP2003-313292A, JP2003-287623A, JP2011-241215A, JP2014-034581A, LC-756 manufactured by BASF SE, and the like can be used.

A content of the chiral agent in the liquid crystal composition is preferably 0.01% to 200% by mol and more preferably 1% to 30% by mol, with respect to the amount of the polymerizable liquid crystal compound.

—Polymerization Initiator—

In a case where the liquid crystal composition includes a polymerizable compound, the liquid crystal composition preferably includes a polymerization initiator. In an aspect in which a polymerization reaction progresses with ultraviolet irradiation, the polymerization initiator to be used is preferably a photopolymerization initiator capable of initiating a polymerization reaction with ultraviolet irradiation. Examples of the photopolymerization initiator include an α-carbonyl compound (described in U.S. Pat. Nos. 2,367,661A and 2,367,670A), an acyloin ether (described in U.S. Pat. No. 2,448,828A), an α-hydrocarbon-substituted aromatic acyloin compound (described in U.S. Pat. No. 2,722,512A), a polynuclear quinone compound (described in U.S. Pat. Nos. 3,046,127A and 2,951,758A), a combination of a triaryl imidazole dimer and p-aminophenyl ketone (described in U.S. Pat. No. 3,549,367A), an acridine compound and a phenazine compound (described in JP1985-105667A (JP-S60-105667A) and U.S. Pat. No. 4,239,850A), an oxadiazole compound (described in U.S. Pat. No. 4,212,970A), and the like.

A content of the photopolymerization initiator in the liquid crystal composition is preferably 0.1% to 20% by mass and more preferably 0.5% to 12% by mass, with respect to a content of the polymerizable liquid crystal compound.

—Crosslinking Agent—

In order to improve a film hardness after curing and to improve durability, the liquid crystal composition may include a crosslinking agent. As the crosslinking agent, a curing agent that can perform curing with ultraviolet rays, heat, moisture, or the like can be suitably used.

The crosslinking agent is not limited and can be appropriately selected depending on the purpose. Examples of the crosslinking agent include: a polyfunctional acrylate compound such as trimethylol propane tri(meth)acrylate, or pentaerythritol tri(meth)acrylate; an epoxy compound such as glycidyl (meth)acrylate, or ethylene glycol diglycidyl ether; an aziridine compound such as 2,2-bis hydroxymethyl butanol-tris[3-(1-aziridinyl)propionate], or 4,4-bis(ethyleneiminocarbonylamino)diphenylmethane; hexamethylene diisocyanate, an isocyanate compound such as a biuret-type isocyanate; a polyoxazoline compound having an oxazoline group at a side chain thereof; an alkoxysilane compound such as vinyl trimethoxysilane, or N-(2-aminoethyl)-3-aminopropyltrimethoxysilane, and the like. In addition, depending on a reactivity of the crosslinking agent, a known catalyst can be used, and not only the film hardness and the durability but also productivity can be improved. Among these crosslinking agents, one kind may be used alone, or two or more kinds may be used in combination.

A content of the crosslinking agent is preferably 3% to 20% by mass and more preferably 5% to 15% by mass, with respect to the solid content mass of the liquid crystal composition. In a case where the content of the crosslinking agent is in the above described range, an effect of improving a crosslinking density can be easily obtained, and a stability of a cholesteric liquid crystalline phase is further improved.
—Polymerization Inhibitor—

In order to improve storage, the liquid crystal composition may include a polymerization inhibitor.

Examples of the polymerization inhibitor include hydroquinone, hydroquinone monomethyl ether, phenothiazine, benzoquinone, hindered amine (HALS), and derivatives thereof. Among these polymerization inhibitors, one kind may be used alone, or two or more kinds may be used in combination.

A content of the polymerization inhibitor is preferably 0% to 10% by mass and more preferably 0% to 5% by mass, with respect to the solid content mass of the liquid crystal composition.

In a case where the cholesteric particles 34 are formed, the liquid crystal composition is preferably used as liquid.

The liquid crystal composition may include a solvent. The solvent is not particularly limited and can be appropriately selected depending on the purpose. An organic solvent is preferably used.

The organic solvent is not particularly limited and can be appropriately selected depending on the purpose. Examples of the organic solvent include ketones such as methyl ethyl ketone, methyl isobutyl ketone, cyclohexanone, or cyclopentanone, alkyl halide, amide, sulfoxide, a heterocyclic compound, hydrocarbon ester, ether, and the like. Among these solvents, one kind may be used alone, or two or more kinds may be used in combination. Among these, ketones are preferable in consideration of an environmental burden. The above described component such as the above described monofunctional polymerizable monomer may function as the solvent.

The cholesteric particles 34 may be formed by a known method.

As an example, the cholesteric particles 34 can be formed by performing emulsion polymerization, suspension polymerization, or dispersion polymerization on the above described liquid crystal composition, as described in JP2002-201222A. Polymerization methods and reaction conditions are described in S. R. Sandler and W. Karo, Polymer Synthesis, Vol. 1, 2nd edition published 1992.

As a specific example, as described in JP2005-112945A, a method of forming the cholesteric particles 34 is exemplified. In the method, the above described liquid crystal composition is dispersed in an incompatible solvent to be emulsified, and the emulsion is cooled or heated, thereby aligning the liquid crystal compound to have a helical structure of a cholesteric liquid crystalline phase. Thereafter, the liquid crystal compound is polymerized by photopolymerization or the like with ultraviolet irradiation.

As is well known, the cholesteric liquid crystalline phase specularly reflects right circularly polarized light or left circularly polarized light, which has been incident, in a specific wavelength range. That is, in a case where light is incident on the cholesteric liquid crystalline phase in the normal direction (in a case where light is vertically incident on a surface), the light is retroreflected.

Therefore, in a case where light is incident on the cholesteric particles 34 having the spherical structure in a direction orthogonal to the tangent line of an incident position, that is, in the normal direction, the cholesteric particles 34 retroreflects the incident light. Therefore, the marker 16 formed by arranging the cholesteric particles 34 two-dimensionally on the surface of the support 32 retroreflects most of the incident measurement light.

On the other hand, in a case where light is obliquely incident, in the cholesteric liquid crystalline phase, the reflection wavelength range is shifted to a short wavelength side due to a so-called blue shift. Therefore, the measurement light is not reflected even though the measurement light is obliquely incident on the cholesteric particles 34 with respect to the normal line, and only the measurement light that is incident from the normal direction is retroreflected.

As described above, the cholesteric liquid crystalline phase has wavelength selectivity for reflection. Therefore, a selective reflection center wavelength of the cholesteric liquid crystalline phase forming the cholesteric particles 34 is set to appropriately reflect the measurement light emitted from the emitting unit 12.

As described above, in the signal detection system 10 according to the embodiment of the present invention, the measurement light emitted from the emitting unit 12 preferably includes light in the wavelength range of 700 to 2000 nm. Therefore, the cholesteric liquid crystalline phase forming the cholesteric particles 34 preferably has the selective reflection center wavelength in the wavelength range of 700 to 2000 nm.

A particle diameter of each of the cholesteric particles 34 forming the marker 16 is not limited, and may be appropriately set depending on a size of the marker 16, the reflection wavelength, or the like.

The particle diameter (maximum length) of the cholesteric particles 34 is preferably 1 to 100 µm, more preferably 2 to 50 µm, and even more preferably 4 to 30 µm.

Hereinafter, the present invention will be described in more detail with explaining an operation of the signal detection system 10.

In the following description, for simplicity of representation, it is assumed that the circular polarization filter 24 and the circular polarization filter 28 transmit only right circularly polarized light and block left circularly polarized light, and the marker 16 reflects only right circularly polarized light and transmits left circularly polarized light.

However, in the signal detection system 10, light transmitted through the circular polarization filter 24 and the circular polarization filter 28, and light reflected on the marker 16 may include a left circular polarized light component. That is, in the signal detection system 10, a condition, in which an intensity of the measurement light (transmittance of the circular polarization filter 24), a reflectance of the marker 16, and a detection sensitivity of the detecting unit 14 (transmittance of the circular polarization filter 28) in the right circularly polarized light are higher than that of the left circularly polarized light, may be satisfied. In the signal detection system 10, in a case where this condition is satisfied, noise from a signal to be detected, that is, the measurement light measured by the detecting unit 14 can be reduced with the same effect.

In addition, in a case where the measurement light is polarized light such as linear polarized light, elliptic polarized light, or the like other than circularly polarized light, noise can be reduced with the same effect.

In addition, as an example, LEDs having a center wavelength of 850 nm are used as the light source 20.

Furthermore, as an example, the marker 16 includes the cholesteric particles 34 on the surface of the support 32 as shown in FIG. 2, the cholesteric particles 34 being two-dimensionally arranged, and the selective reflection center wavelength at which light is vertically incident on the cholesteric liquid crystalline phase forming the cholesteric particles 34 is 850 nm.

In a case of detecting a signal, that is, detecting the marker 16 in the signal detection system 10, the light source 20 of the emitting unit 12 is operated and the detector 26 of the detecting unit 14 captures an image.

The light emitted from the light source 20 passes through the circular polarization filter 24, so that right circularly polarized light becomes measurement light.

The measurement light of the right circularly polarized light is incident on the marker 16. As described above, the marker 16 has the selective reflection center wavelength of 850 nm, at which light is vertically incident, and is a marker on which the cholesteric particles 34 formed by immobilizing the cholesteric liquid crystalline phase that reflects right circularly polarized light is arranged. Therefore, the marker 16 retroreflects the measurement light that is vertically incident on the cholesteric particles 34.

The measurement light retroreflected on the marker 16 is incident on the detecting unit 14.

As described above, since the measurement light is the right circularly polarized light, the measurement light passes through the circular polarization filter 28 that transmits only the right circularly polarized light, is incident on the detector 26, and is measured. In the signal detection system 10, as an example, image processing means (not shown) performs image analysis on the marker 16 in the image captured by the detector 26 to generate three-dimensional data by a known method using the principle of triangulation. In the signal detection system 10, the marker 16, that is, a movement of the subject, a distance to the subject, and the like are measured from the generated three-dimensional data.

Here, in a case where the signal detection system 10 is used outdoors, or the like, near infrared light included in sunlight is scattered at a place other than the marker 16 and this scattered light is incident on the detecting unit 14 and measured by the detector 26, thereby scattered noise being caused, and the scattered noise is considered as noise in the signal detection system 10.

Figure 3:
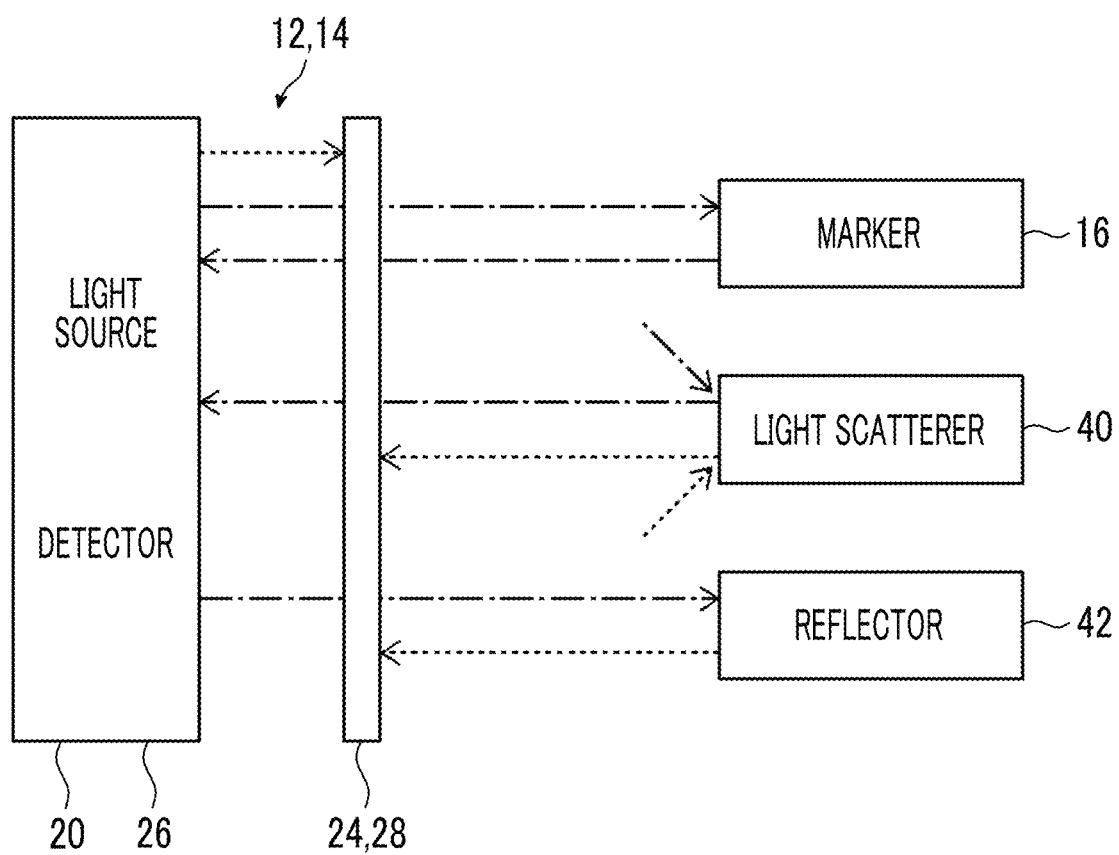
FIG. 3 is a conceptual diagram for explaining an operation of the signal detection system shown in FIG. 1.

However, in the signal detection system 10 of the present invention, the detecting unit 14 has the circular polarization filter 28 that transmits only the right circularly polarized light. That is, the detecting unit 14 measures only the right circularly polarized light. Therefore, as shown in FIG. 3 that conceptually illustrates right circularly polarized light drawn by a dashed-dotted line and left circularly polarized light drawn by a broken line, respectively, in the scattered light scattered by the light scatterer 40 to be incident on the detecting unit 14, a left circular polarized light component is blocked by the circular polarization filter 28, and only a right circular polarized light component passes through the circular polarization filter 28 and is incident on the detector 26. Therefore, according to the signal detection system 10 of the embodiment in the present invention, the scattered light that is incident on the detector 26 to be noise is only the right circular polarized light component, and therefore the scattered noise can be reduced by half.

In addition, the measurement light specularly reflected on a reflector such as a metal surface or the like other than the marker 16 (subject) is incident on the detecting unit 14 and measured by the detector 26, thereby specular reflection noise being caused, and the specular reflection noise is considered as the noise in the signal detection system 10.

Here, the measurement light emitted from the emitting unit 12 is right circularly polarized light, and the measurement light specularly reflected on the reflector other than the marker 16 is left circularly polarized light having an opposite turning direction of circularly polarized light to the right circularly polarized light. In addition, as described above, the detecting unit 14 has the circular polarization filter 28 that transmits only the right circularly polarized light. Therefore, as shown in FIG. 3, the measurement light reflected on the reflector 42 other than the marker 16, which is left circularly polarized light, is removed by the circular polarization filter 28 and is not incident on the detector 26, so that the specular reflection noise can be removed.

On the other hand, the measurement light emitted from the emitting unit 12 is right circularly polarized light, the measurement light reflected on the marker 16 is also right circularly polarized light, and the measurement light measured by the detecting unit 14 is also right circularly polarized light. Therefore, as shown in FIG. 3, the measurement light that is the right circularly polarized light emitted from the emitting unit 12, retroreflected on the marker 16, and measured by the detecting unit 14 is appropriately measured.

That is, in the signal detection system 10, by making the polarized light of the measurement light reflected on the marker 16, and the polarized light of the measurement light emitted from the emitting unit 12 and the measurement light detected by the detecting unit 14 to be uniform, as shown in FIG. 3, only the noise is reduced while maintaining a state where a signal intensity, that is, an intensity of the measurement light is constant, and thus it is possible to perform accurate measurement, that is, signal detection.

In addition, as a preferred aspect, the cholesteric particle 34 that is the spherical reflector in which a cholesteric liquid crystalline phase is immobilized is used as a reflector in the marker 16, in the signal detection system 10 of the illustrated example.

Therefore, by using near infrared light as the measurement light, the marker 16 can be transparent (semi-transparent), and in a case where the marker 16 is attached to a subject, the marker 16 can be inconspicuous.

As a preferred aspect, the signal detection system 10 of the illustrated example satisfies both a first condition and second condition, in which in the first condition, an intensity of the right circularly polarized light (first polarized light) is higher than an intensity of the left circularly polarized light (second polarized light), in the emitted light emitted from the emitting unit 12, and in the second condition, a detection sensitivity of the right circularly polarized light is higher than a detection sensitivity of the left circularly polarized light, in the detecting unit 14.

However, the signal detection system according to the embodiment of the present invention is not limited thereto, and may satisfy only one of the first condition or the second condition. As will be described later in Examples, even in a case where only one of the first condition or the second condition is satisfied, noise can be sufficiently and suitably reduced from the detected signal.

However, it is preferable that the signal detection system according to the embodiment of the present invention satisfies both the first condition and the second condition in that noise can be more suitably reduced and accurate measurement can be performed.

In addition, in the signal detection system 10 of the illustrated example, the light source 20 and the detector 26 are separately provided, but the light source 20 and the detector 26 may be integrated into a unit. In this case, in addition to the light source 20 and the detector 26, at least one of the circular polarization filter 24 or the circular polarization filter 28 may be integrated into a unit.

Furthermore, in the signal detection system 10 of the illustrated example, the light source 20 and the detector 26 are provided with the circular polarization filter 24 and the circular polarization filter 28, separately, but the present invention is not limited thereto. That is, the signal detection system of according to the embodiment of the present invention may have a configuration in which only one circular polarization filter is provided corresponding to both the light source 20 and the detector 26.

Although the signal detection system according to the embodiment of the present invention has been described in detail above, the present invention is not limited to the examples described above. It goes without saying that the present invention may be improved or modified in various ways within a scope that does not depart from the gist of the present invention.

EXAMPLES

The features of the present invention will be described in detail with reference to the following examples. The materials, the reagents, the used amounts, the amounts of substances, the ratios, the treatment contents, and the treatment procedures described in the following examples can be appropriately changed within the range that does not depart from the gist of the present invention. Therefore, the range of the present invention should not be limitatively interpreted by the following specific examples.

<Preparation of Polymerizable Liquid Crystal Composition A-1>

The following components were mixed to prepare a polymerizable liquid crystal composition A-1.

| | |
|---|---|
| The following compound M-1 | 84 parts by mass |
| The following compound M-2 | 15 parts by mass |
| The following compound M-3 | 1 part by mass |
| Chiral agent LC-756 (manufactured by BASF) | 5.2 parts by mass |
| The following air interface aligning agent M-4 | 0.2 parts by mass |
| Polymerization initiator Irg819 (manufactured by BASF SE) | 3 parts by mass |
| Ethyl acetate | 900 parts by mass |

<Preparation of Polymerizable Liquid Crystal Composition A-2>

The following components were mixed to prepare a polymerizable liquid crystal composition A-2.

| | |
|---|---|
| The following compound M-1 | 84 parts by mass |
| The following compound M-2 | 15 parts by mass |
| The following compound M-3 | 1 part by mass |
| Chiral agent LC-756 (manufactured by BASF SE) | 3 parts by mass |
| The following air interface aligning agent M-4 | 0.2 parts by mass |
| Polymerization initiator Irg819 (manufactured by BASF SE) | 3 parts by mass |
| Ethyl acetate | 900 parts by mass |

Compound M-1 (Structure Below)

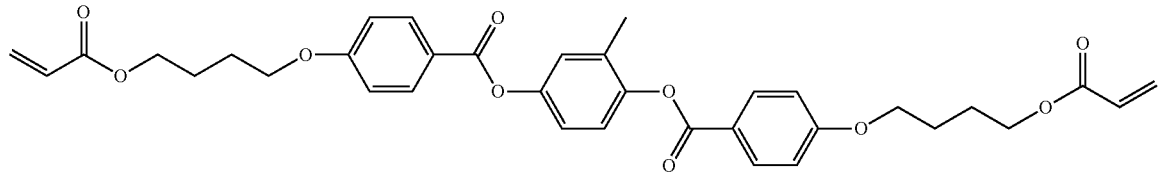 [SMILES: C=CC(=O)OCCCCOc1ccc(C(=O)Oc2ccc(OC(=O)c3ccc(OCCCCOC(=O)C=C)cc3)c(C)c2)cc1]

Compound M-2 (Structure Below)

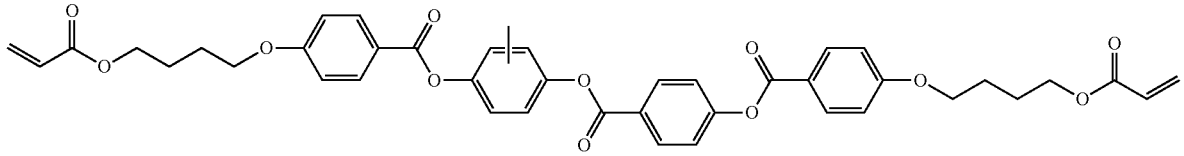

Compound M-3 (Structure Below)

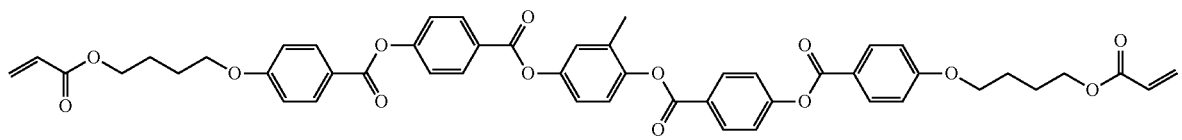 [SMILES: C=CC(=O)OCCCCOc1ccc(C(=O)Oc2ccc(C(=O)Oc3ccc(OC(=O)c4ccc(OC(=O)c5ccc(OCCCCOC(=O)C=C)cc5)cc4)c(C)c3)cc2)cc1]

Air Interface Aligning Agent M-4 (Structure Below)

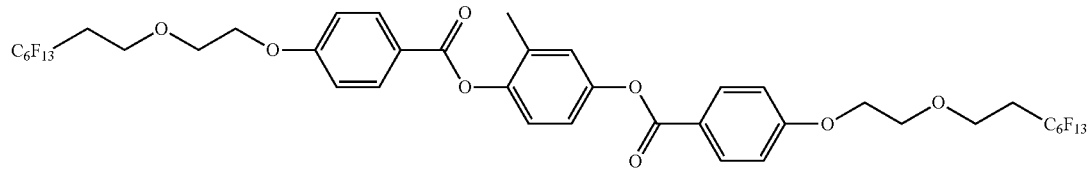

<Confirmation of Reflection Wavelength>

A polyethylene terephthalate film whose only one surface is easy-adhesion treated and which has a thickness of 100 µm (COSMOSHINE A-4100, manufactured by Toyobo Co., Ltd.) was subjected to rubbing treatment on a surface that is not subjected to easy-adhesion treatment.

The polymerizable liquid crystal composition A-1 was applied to the rubbing treated surface of the polyethylene terephthalate film at room temperature so that a dry film thickness after drying was 3.5 µm.

The coating layer was dried at room temperature for 60 seconds and then heated at 85° C. for 2 minutes. Thereafter, by using a D bulb (lamp 90 mW/cm) manufactured by Fusion Co., Ltd., ultraviolet irradiation was performed at an output of 60% and 30° C. for 6 to 12 seconds to obtain a cholesteric liquid crystal layer formed by immobilizing a cholesteric liquid crystalline phase.

Reflection characteristics of the obtained cholesteric liquid crystal layer were confirmed by a spectrophotometer (manufactured by Shimadzu Corporation, UV-3100PC). As a result, a selective reflection center wavelength of a cholesteric liquid crystal layer formed of the polymerizable liquid composition A-1 for vertically incident light was 540 nm. Vertically incident light is light that is vertically incident on a surface (light is incident from the normal direction).

A cholesteric liquid crystal layer was similarly formed using the polymerizable liquid crystal composition A-2, and reflection characteristics thereof were similarly confirmed.

As a result, a selective reflection center wavelength of a cholesteric liquid crystal layer formed of the polymerizable liquid crystal composition A-2 for vertically incident light was 850 nm.

<Production of Cholesteric Particles Having Retroreflectivity>

100 mL (liter) of an aqueous solution of polyvinyl alcohol (Kuraray Poval PVA203, manufactured by Kuraray Co., Ltd.) having a concentration of 1% by mass was put into a homomixer.

While stirring the polyvinyl alcohol aqueous solution at a rotation speed of 1500 rpm, 10 mL of the polymerizable liquid crystal composition A-1 was added, and the stirring was continued for 5 minutes to prepare an emulsion. This emulsion was left at 80° C. for 3 minutes. The operations up to this point were all performed under yellow light.

Next, this emulsion was irradiated with ultraviolet rays for 60 seconds with a 3000 W high pressure mercury lamp at an irradiation distance of 15 cm.

A part of this solution was spread on a slide glass and observed with a polarizing microscope. As a result, it was confirmed that spherical fine particles A-1 having a particle diameter of 20 µm or less was produced.

A part of this fine particles A-1 was spread on a black paper and irradiated with white light having right circularly polarized light and left circularly polarized light. As a result, the fine particles A-1 exhibited a bright green reflection color for the right circularly polarized white light, but did not show the reflection color for the left circularly polarized white light. Thereby, it was confirmed that the fine particles A-1 were cholesteric particles having selective reflection characteristics for green light and polarization characteristics for reflecting the right circularly polarized light.

It was also confirmed that in a case where a direction of incident light was changed, in the fine particles A-1, the reflected light in the same direction as the incident light was always enhanced. Thereby, it was also confirmed that the fine particles A-1 had retroreflectivity.

Example 1

A sample was produced by spreading the prepared fine particles A-1 on a copy paper manufactured by Fuji Xerox Co., Ltd. A signal detection test with visible light was performed by capturing an image of this sample with a polarizing microscope equipped with a camera.

A light source of the microscope was set to epi-illumination mode. In addition, a circular polarization filter that transmits right circularly polarized light and blocks left circularly polarized light is disposed with respect to the light source and a detector. That is, in this example, in a case where the fine particles A-1 are regarded as one marker, the signal detection system as shown in FIG. 1 is configured.

The captured image was converted into gray scale, portions where brightness (Y value) of a target portion of the image exceeded the threshold value were regarded as a signal, and the number of portions was counted.

As a result, there were 43 signals corresponding to the fine particles A-1, there were 4 signals corresponding to noise other than the fine particles A-1, and a ratio of the "fine particle/noise" was 10.7.

Example 2 and Example 3, and Comparative Example 1

In Example 1, at least one of the circular polarization filter disposed with respect to the light source or the circular polarization filter disposed with respect to the detector was appropriately removed, and a signal detection test was conducted in the same manner as in Example 1. Thereafter, the number of signals corresponding to the fine particles A-1 and the number of signals corresponding to noise other than the fine particles A-1 were counted, and a ratio thereof was calculated.

Comparative Example 2

The signal detection test was performed in the same manner as in Example 1, the number of signals corresponding to glass beads and the number of signals corresponding to noise other than the glass beads were counted, and a ratio thereof was calculated, except that instead of the fine particles A-1, general glass beads (UB-052NH manufactured by Unitika Ltd., particle diameter of 25 to 45 µm) having no polarization characteristics, which are used for a general retroreflective plate, were used.

The results are shown in the table below. The results of Example 1 are also shown in the table.

TABLE 1

| | Circular polarization filter | | | Signal [the number] | | |
|---|---|---|---|---|---|---|
| | Light source | Detector | Fine particles | Fine particle | Noise | Ratio of fine particle/noise |
| Example 1 | Provided | Provided | Right circularly polarized light reflection | 43 | 4 | 10.8 |
| Example 2 | Not Provided | Provided | Right circularly polarized light reflection | 47 | 9 | 5.2 |
| Example 3 | Provided | Not Provided | Right circularly polarized light reflection | 43 | 9 | 4.8 |
| Comparative Example 1 | Not Provided | Not Provided | Right circularly polarized light reflection | 48 | 19 | 2.5 |
| Comparative Example 2 | Provided | Provided | No polarized light characteristics | 13 | 4 | 3.3 |

As shown in Table 1, according to the signal detection system of the embodiment in the present invention provided with the marker in which the cholesteric particles that retroreflects right circularly polarized light are used and the circular polarization filter that transmits the right circularly polarized light and that blocks the left circularly polarized light on at least one of the light source or the detector, the cholesteric particles that correspond to the marker can be appropriately detected and noise can also be reduced significantly. In particular, in Example 1 in which the circular polarization filters were provided on both the light source and the detector, noise can be very suitably reduced.

On the other hand, in Comparative Example 1 in which the circular polarization filter was not provided, the cholesteric particles that correspond to the marker can be appropriately detected, but there is much noise. Furthermore, in Comparative Example 2 in which the general glass beads having no polarization characteristics were used as the marker, since the polarized light of the reflected light is the left circularly polarized light in a case where retroreflection occurs due to the glass beads, the number of detected markers is small.

<Production of Cholesteric Particles Having Retroreflectivity>

Fine particles A-2 were produced in the same manner as the fine particles A-1, except that the polymerizable liquid crystal composition A-2 was used instead of the polymerizable liquid crystal composition A-1.

The polymerizable liquid crystal composition A-2 has the same composition as the polymerizable liquid crystal composition A-1 except that the formulation amount of the chiral agent is different. In addition, as described above, the cholesteric liquid crystal layer formed of the polymerizable liquid crystal composition A-2 has a selective reflection center wavelength of 850 nm with respect to vertically incident light.

Therefore, the fine particles A-2 are cholesteric particles having retroreflectivity, which have selective reflection characteristics for near infrared light and which reflect the right circularly polarized light.

Example 4

The letter "F" was drawn on the copy paper manufactured by Fuji Xerox Co., Ltd., using the produced fine particles A-2.

An LED light source having a center wavelength of 850 nm was used as a light source, and a general CCD camera having sensitivity at 850 nm was used as a detector. In front of the light source and the camera, a circularly polarized light separating film C described in the example of JP2014-219278A was disposed. This circularly polarized light separating film C is a circular polarization filter that transmits the right circularly polarized light and that blocks the left circularly polarized light. That is, similar to Example 1 and the like, in a case where the fine particles with the letter "F" are regarded as the marker, the signal detection system as shown in FIG. 1 is also configured in this example.

By using such an optical system, a copy paper is irradiated with light emitted in the direction of 45° from a light source, and an image was captured with a CCB camera in the same direction.

As a result, the letter "F" that was not recognized under visible light was recognized in the captured image. That is, according to the present invention, noise can be reduced and the measurement light retroreflected on the marker can be suitably detected as a signal.

From the above results, the effect of the present invention is clear.

The signal detection system of the present invention can be suitably used as motion capture or the ranging system.

EXPLANATION OF REFERENCES

10: signal detection system
12: emitting unit
14: detecting unit
16: marker
20: light source
24, 28: circular polarization filter
26: detector
32: support body
34: cholesteric particles
40: light scatterer
42: reflector

What is claimed is:

1. A signal detection system comprising:
an emitting unit that emits polarized light as measurement light;
a retroreflection member on which the measurement light emitted from the emitting unit is retroreflected; and
a detecting unit that measures the measurement light reflected on the retroreflection member,
wherein in the retroreflection member, a reflectance of first polarized light is higher than a reflectance of second polarized light which is polarized light having a property opposite to that of the first polarized light, and
at least one of a first condition in which in the measurement light emitted from the emitting unit, an intensity of the first polarized light is higher than an intensity of the second polarized light, or a second condition in which in the detecting unit, a detection sensitivity of the first polarized light is higher than a detection sensitivity of the second polarized light is satisfied.

2. The signal detection system according to claim 1, wherein the first condition and the second condition are satisfied.

3. The signal detection system according to claim 1, wherein the first polarized light is circularly polarized light, and the second polarized light is circularly polarized light having a turning direction opposite to a turning direction of the first polarized light.

4. The signal detection system according to claim 1, wherein light emitted from the emitting unit includes light having a wavelength of 700 to 2000 nm.

5. The signal detection system according to claim 1, wherein the retroreflection member includes a reflector in which a cholesteric liquid crystalline phase is immobilized.

6. The signal detection system according to claim 1, wherein the retroreflection member includes a spherical reflector.

7. The signal detection system according to claim 1, wherein a plurality of the retroreflection members are disposed to be spaced apart from one another.

8. The signal detection system according to claim 1, wherein the emitting unit includes a light source and a polarization filter.

9. The signal detection system according to claim 8, wherein the polarization filter is a reflective polarization filter.

10. The signal detection system according to claim 9, wherein the reflective polarization filter is a reflective circular polarization filter including a reflective layer in which a cholesteric liquid crystalline phase is immobilized.

11. The signal detection system according to claim 1, wherein the detecting unit includes a detector and a polarization filter.

* * * * *